(12) United States Patent
Gloor

(10) Patent No.: US 7,990,009 B2
(45) Date of Patent: Aug. 2, 2011

(54) ELECTRIC MACHINE

(75) Inventor: Rolf Gloor, Sufers (CH)

(73) Assignee: Gloor Engineering, Sufers (CH)

( * ) Notice: Subject to any disclaimer, the term of this patent is extended or adjusted under 35 U.S.C. 154(b) by 0 days.

(21) Appl. No.: 12/540,428

(22) Filed: Aug. 13, 2009

(65) Prior Publication Data

US 2009/0295237 A1    Dec. 3, 2009

Related U.S. Application Data

(63) Continuation of application No. PCT/CH2008/000064, filed on Feb. 15, 2008.

(30) Foreign Application Priority Data

Feb. 15, 2007    (CH) ........................................ 255/07

(51) Int. Cl.
*H02K 16/00*    (2006.01)
(52) U.S. Cl. ........................................ 310/114; 310/268
(58) Field of Classification Search .......... 310/112–114, 310/266, 268, 181, 46
See application file for complete search history.

(56) References Cited

U.S. PATENT DOCUMENTS

| | | | |
|---|---|---|---|
| 2,796,571 A | | 6/1957 | Dunn |
| 3,469,133 A | | 9/1969 | Stcherbatcheff |
| 5,481,147 A | * | 1/1996 | Kaplan et al. ............... 310/181 |
| 5,798,594 A | * | 8/1998 | Radovsky ................. 310/180 |
| 5,955,808 A | * | 9/1999 | Hill .......................... 310/180 |
| 6,175,178 B1 | * | 1/2001 | Tupper et al. ............. 310/166 |
| 6,177,746 B1 | * | 1/2001 | Tupper et al. ............. 310/166 |
| 7,453,180 B2 | * | 11/2008 | van den Bergh et al. ...................... 310/156.37 |
| 2004/0090134 A1 | * | 5/2004 | Ide et al. .................... 310/112 |
| 2008/0001495 A1 | * | 1/2008 | Qu et al. .................... 310/268 |

FOREIGN PATENT DOCUMENTS

| | | |
|---|---|---|
| DE | 1232652 | 1/1967 |
| DE | 3536538 A1 | 4/1987 |
| DE | 9114582 | 3/1992 |
| DE | 19547159 | 6/1996 |
| EP | 0349056 | 1/1990 |
| FR | 2239035 | 7/1973 |
| FR | 2266354 | 3/1974 |
| WO | 01/29955 A1 | 4/2001 |
| WO | 03/003546 A1 | 1/2003 |
| WO | 2005/119886 A2 | 12/2005 |
| WO | 2006/126552 A1 | 11/2006 |

* cited by examiner

*Primary Examiner* — Dang D Le
(74) *Attorney, Agent, or Firm* — Maginot, Moore & Beck

(57) ABSTRACT

An electrical machine which has a moving part and a stationary part. The moving part is in the form of an inner rotor without windings, and the rotor which has at least two magnetic conductors, which are separated from one another axially such that impeller wheels are formed. The stationary part has a number of magnetically acting webs in the circumferential direction of the machine. The webs are operatively connected to the magnetic conductors of the rotor. The stationary part has at least one first winding structure which is likewise operatively connected to the axially separated magnetic conductors of the rotor. In addition, a second winding structure is included on the webs wherein either the first winding structure acts as an armature winding and the second winding structure acts as a field winding, or vice versa. The impeller wheels are radially innerly magnetically effectively connected by means of a further magnetic conductor.

9 Claims, 4 Drawing Sheets

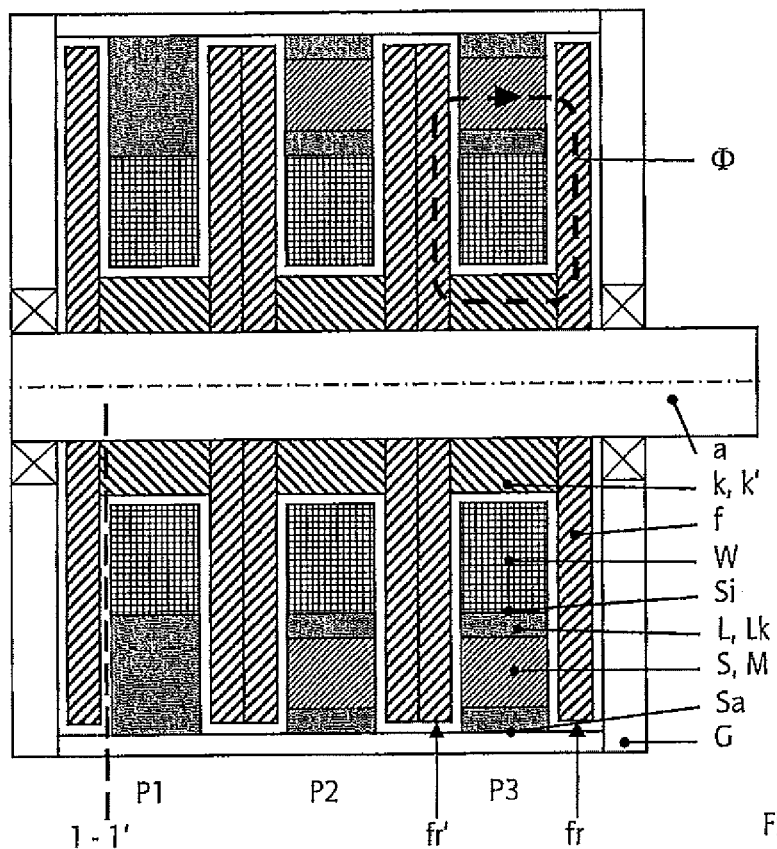
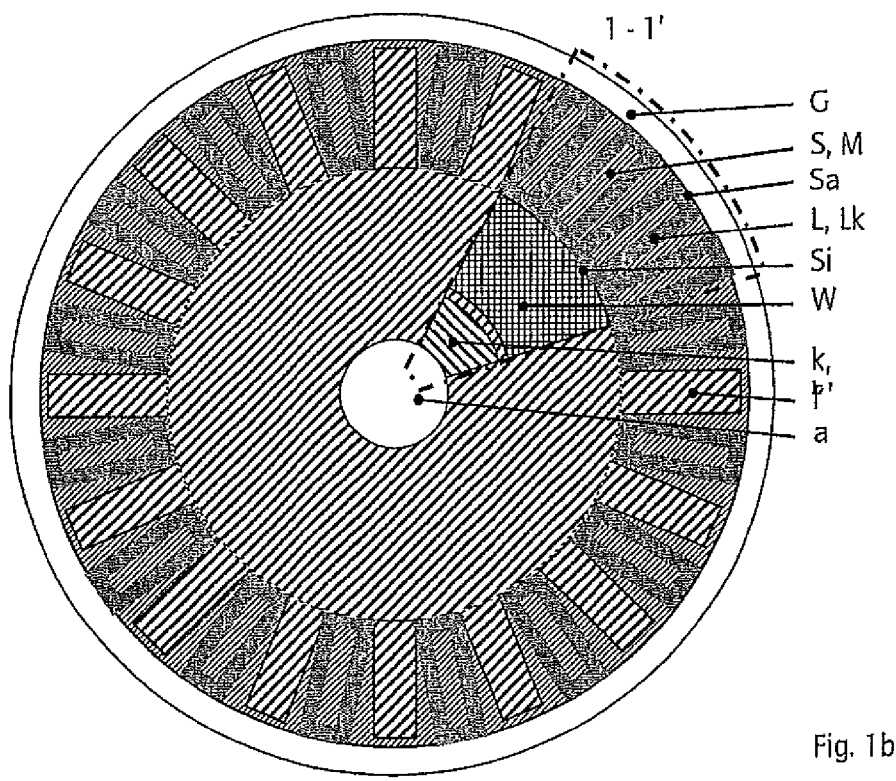

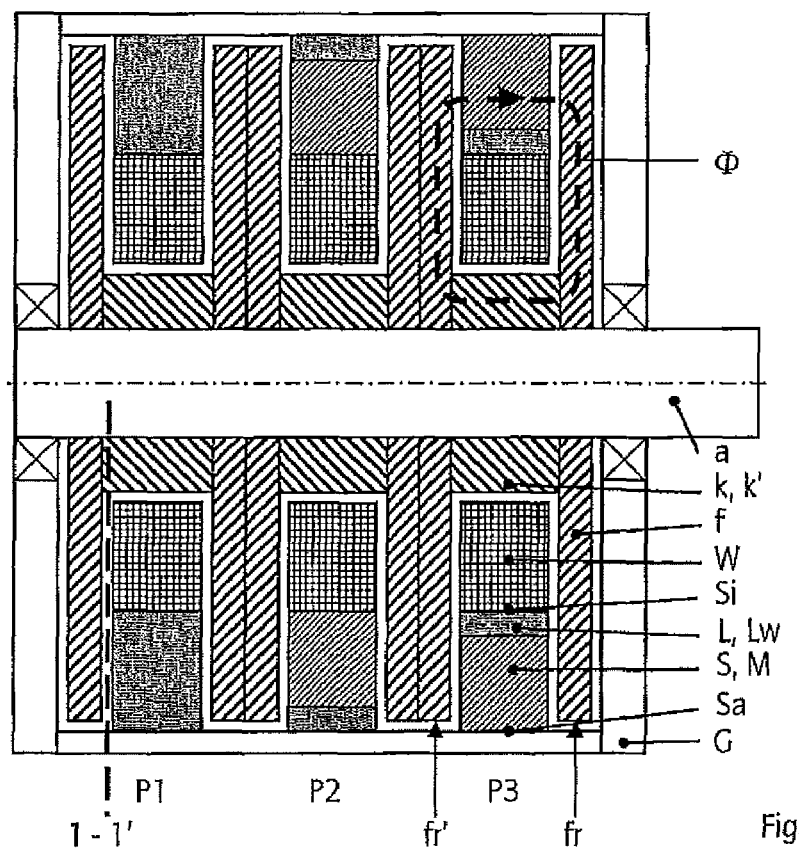
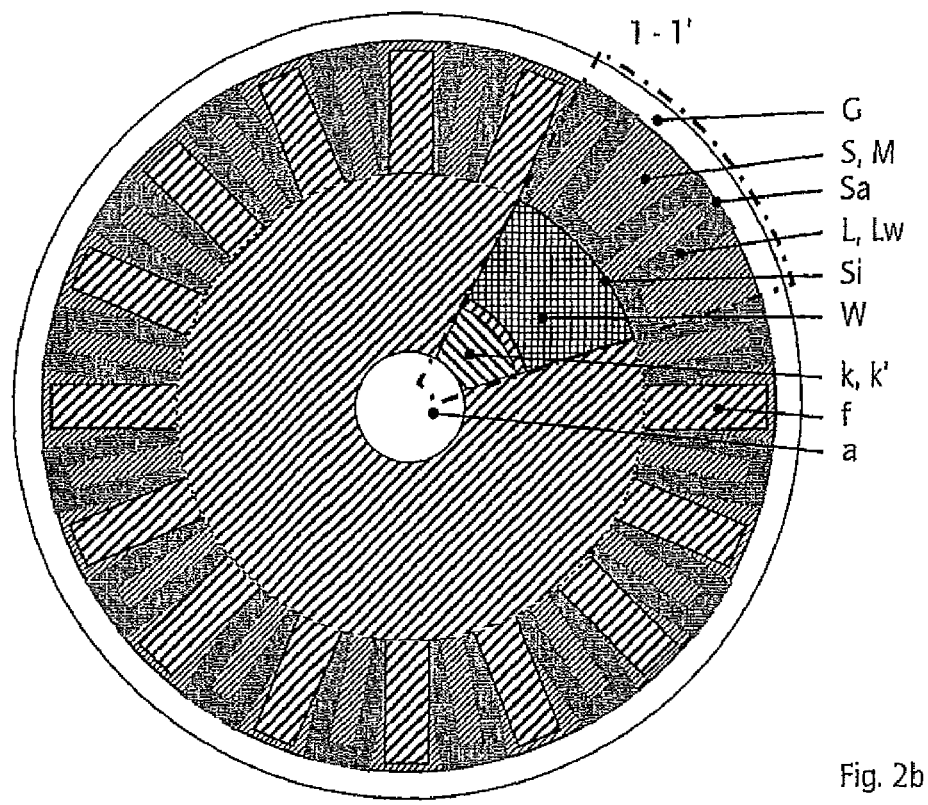

ELECTRIC MACHINE

CROSS-REFERENCE TO RELATED APPLICATIONS

This application is a continuation of international patent application no. PCT/CH2008/000064, filed Feb. 15, 2008, which claims priority from Switzerland application no. 255/07, filed Feb. 15, 2007.

FIELD

This document relates to the field of electrical machines, and relates in particular to an electrical machine such as this for conversion of electrical energy to mechanical energy and vice versa, comprising a moving part and a stationary part.

BACKGROUND

The technology of transverse flux guidance for electrical machines has been known for several decades. However, transverse flux machines are considered to be complicated to produce and known transverse flux machines nowadays actually have a large number of different components in comparison to conventional electrical rotating machines, whose assembly is time-consuming and therefore costly.

On the other hand, conventional electrical machines for drive technology require special adaptations for power transmission, for example on the mechanical side, such as a reduction gearbox, in order to allow an appropriately high torque, for example, to be passed to the rotor hub of a wind power station. This gearbox is not only associated with additional costs but also requires space, accommodation, and friction losses. These adverse features can be avoided only if drives can be designed without a gearbox. A high torque is required for this purpose, which can be provided by a transverse flux machine with its excellent characteristics in terms of specific torque and efficiency. For this reason, a transverse flux machine appears to be particularly suitable for use as a direct drive machine.

Irrespective of their good characteristics, until now, there has not been any major interest in large-scale manufacture of transverse flux machines, because they are complicated to produce.

DE 35 36 538 A1 discloses soft-iron elements with a U-profile which are installed, corresponding to the number of pole pairs, in a stationary machine part, and close the magnetic circuit. In this case, the moving machine part is in the form of an internal rotor in the form of a disk; it has an alternating sequence of permanent magnets on its disk surfaces, which are arranged at right angles to a rotor axis, for excitation purposes. These permanent magnets are subject to centrifugal forces corresponding to the rotation speed of the machine, and this can represent a major load on the adhesive connection between such permanent magnets and the rotors.

DE 195 47 159 A1 discloses a transverse flux machine which acts as an external rotor machine with rotating soft-iron elements. Although its design represents a better design variant than DE 35 36 538 A1 with regard to the centrifugal forces that occur, its design, in contrast, is comparatively complex, since the rotor elements which revolve on the outside are held by means of an annular structure for each phase.

WO 2006 126552 discloses an electrical machine for conversion of electrical energy to mechanical energy and vice versa, comprising a moving part and a stationary part, wherein, in the case of transverse magnetic flux guidance, the moving part is in the form of an inner rotor without windings, wherein the rotor comprises at least two magnetic conductors, which are separated from one another axially, for magnetic flux guidance, such that a first and a second impeller wheel are formed, and the stationary part comprises a number of magnetically acting webs in the circumferential direction of the machine, which are operatively connected to the magnetic conductors of the rotor, wherein this stationary part has at least one first winding structure which is likewise operatively connected to the axially separated magnetic conductors of the rotor.

SUMMARY

Against the background of this prior art, it would be advantageous to specify an electrical machine which has a better torque-machine volume ratio, with good resistance to centrifugal forces.

An electric machine may comprise a moving part and a stationary part, wherein, in the case of transverse magnetic flux guidance, the moving part is in the form of an inner rotor without windings, wherein the rotor comprises at least two magnetic conductors, which are separated from one another axially, for magnetic flux guidance, such that a first and a second impeller wheel are formed, and the stationary part comprises a number of magnetically acting webs in the circumferential direction of the machine, which are operatively connected to the magnetic conductors of the rotor, wherein this stationary part has at least one first winding structure which is likewise operatively connected to the axially separated magnetic conductors of the rotor.

A machine for conversion of electrical energy to mechanical energy and vice versa, may comprise a moving part and a stationary part, wherein, in the case of transverse magnetic flux guidance, the moving part is in the form of an internal rotor without any windings.

So-called transverse flux machines such as these are admittedly enjoying increased interest because of their extremely good torque-to-mass ratio, but in contrast they are considered to be complicated and therefore represent a challenge for manufacturing.

As set forth herein, in at least one embodiment, an electrical machine for conversion of electrical energy to mechanical energy and vice versa comprises a moving part and a stationary part, wherein, in the case of transverse magnetic flux guidance, the moving part is in the form of an inner rotor without windings, and the rotor comprises at least two magnetic conductors, which are separated from one another axially, for magnetic flux guidance, here on so-called impeller wheels between which the stationary part has a number of magnetically acting webs in the circumferential direction of the machine, which are operatively connected to the magnetic conductors of the rotor, wherein this stationary part has at least one first winding structure which is likewise operatively connected to the axially separated magnetic conductors of the rotor. In addition, the electric machine has a second winding structure on the webs wherein either the first winding structure acts as an armature winding and the second winding structure acts as a field winding, or vice versa, and wherein the at least one first and the one second impeller wheel are radially innerly magnetically effectively connected by means of a further magnetic conductor.

Starting from the magnetically acting web of the stationary part, the magnetic flux therefore runs via a first magnetic conductor of the rotor onward to an axially adjacent second magnetic conductor of the rotor and back to the magnetically acting web. This magnetic circuit in this case surrounds the first winding structure of the stationary part of the electrical machine.

It is self-evident that these machine parts, which define the magnetic circuit, are suitable for a single-phase machine; a plurality of units can be arranged axially alongside one another, of course, corresponding to the desired number of phases.

The design of the machine has rotor elements which are in the form of impeller wheels with individual magnetic conductors, and annular structures of the stationary part of the machine—in the following text also referred to as a stator—such as the first winding structure. It is therefore possible to design the entire machine to be in the form of a disk (rotor) or in an annular shape (stator), axially. Furthermore, the impeller wheels and the magnetically acting connection close to the axis of adjacent impeller wheels which are associated with one phase rotate in the electric machine. One major advantage of the novel electrical machine is that a significantly greater torque can be produced with centrifugal force resistance that is as good as possible, and therefore with the machine being robust, than is the case in machines according to the prior art, that is to say, for the same physical size as a known machine, the novel machine produces a greater torque or, if the machine is designed on the basis of the torque, the novel electrical machine occupies a considerably smaller volume.

Furthermore, the magnetic circuit design exhibits a particularly effective power flow since the first winding structure can be arranged particularly close to the axis in the stator and, considered radially, the magnetic flux path is closed remotely from the axis via the impeller wheels and the webs in the stator. Because the winding arrangement of the first winding structure is close to the axis, this on the one hand results in the use of a comparatively small amount of conductor copper, wherein this first winding arrangement can be produced very robustly, while on the other hand, because of the small consumption of copper, this results in the machine being more efficient than prior-art machines, with the already mentioned, improved specific torque.

One advantageous refinement of the electrical machine provides for axially adjacent impeller wheels to be connected by means of a magnetic conductor; the impeller wheels may for this purpose—considered in a radial section—have an L-shaped or a T-shaped structure or, alternatively, may be separated by a magnetically permeable ring. A further embodiment provides for the impeller wheels which are arranged alongside one another to be separated by a permanent-magnet ring.

It is advantageous for the machine to have an additional, second winding structure between the radially inner, first winding structure and the radially outer web ends in the stator. In at least one embodiment, the electric machine provides for either the first or the second winding structure to act as a field winding or as an armature winding.

Furthermore, the webs which are surrounded by a second winding structure may each advantageously be in the form of permanent magnets.

The second winding structure may be in the form of individual, independent coil windings, wherein each individual coil winding is arranged as a short-circuited winding between the radially inner, first winding structure and the radially outer web ends.

The second winding structure can also advantageously be arranged in the form of a wave or loop between the first winding structure and the radially outer web ends in the circumferential direction of the machine. If the second winding structure is in the form of a wave, each web of a machine pole has turn parts which run radially on both sides in the circumferential direction, and adjacent webs alternately have only one tangentially outer or tangentially inner winding part. If the second winding structure is in the form of a loop between the first winding structure and the radially outer web ends in the circumferential direction of the machine, each web of one machine pole is surrounded along its radial and tangential web faces by a coil with a number of turns, wherein adjacent coils which each have the same number of turns are located together on the radial web faces and only the simple number of turns of one coil in each case occurs on the tangentially outer and the tangentially inner web faces; this second winding structure in the form of a loop therefore allows the electric machine to be more compact, allowing compensation for an axial magnetic flux component from this second winding structure.

A further advantageous embodiment of the machine provides that the second winding structure is arranged between the first winding structure and a housing which bounds the machine, wherein this second winding structure is in the form of an embedded winding structure, and each partial winding of this second winding structure is arranged between in each case two webs which are adjacent in the circumferential direction. In this case, this second winding structure may be in the form of a short-circuited winding, a wave winding or a loop winding.

Further advantageous embodiments provide for the electrical machine to be a two-phase and polyphase machine. Two or more phases can be provided axially adjacent in the stationary part and are bounded as an assembly by only two impeller wheels of the rotating part of the machine, or each of the two or more phases is in each case located between directly associated impeller wheels. In a circumferential direction, the two or more phases are installed offset with respect to one another, with a desired phase shift.

The novel electrical machine is furthermore distinguished in that it may be in the form of an asynchronous machine or a synchronous machine. In this case, the synchronous machine with an asynchronous starting capability is also an interesting variant.

Its options for use extend from generator operation to motor operation. Wind power stations or direct drives for vehicles are mentioned here by way of example. It is likewise feasible for the novel electrical machine—because of its robust design as described above—to be used with its impeller wheels directly as a generator turbine and/or pump—for example in pump storage power stations—wherein the impeller wheels of the rotor and the webs of the stator then have an appropriately adapted geometry that is optimized for flow purposes. Any fluid medium may, of course, be used in a continuous-flow machine such as this, for example liquids or gases; use as a fan would therefore also be feasible.

BRIEF DESCRIPTION OF THE DRAWINGS

The drawing shows a plurality of exemplary embodiments of the electric machine, in a simplified form, and to be precise:

FIGS. 1a,b respectively show a longitudinal-section illustration and a cross-sectional illustration of an electrical machine in the form of a three-phase asynchronous machine with excitation in the form of short-circuited rings, or a three-phase synchronous machine with excitation in the form of a loop winding;

FIGS. 2a,b respectively show a longitudinal-section illustration and a cross-sectional illustration of the electrical machine in the form of a three-phase synchronous machine with excitation in the form of a wave winding structure;

DESCRIPTION

Figure 3A:
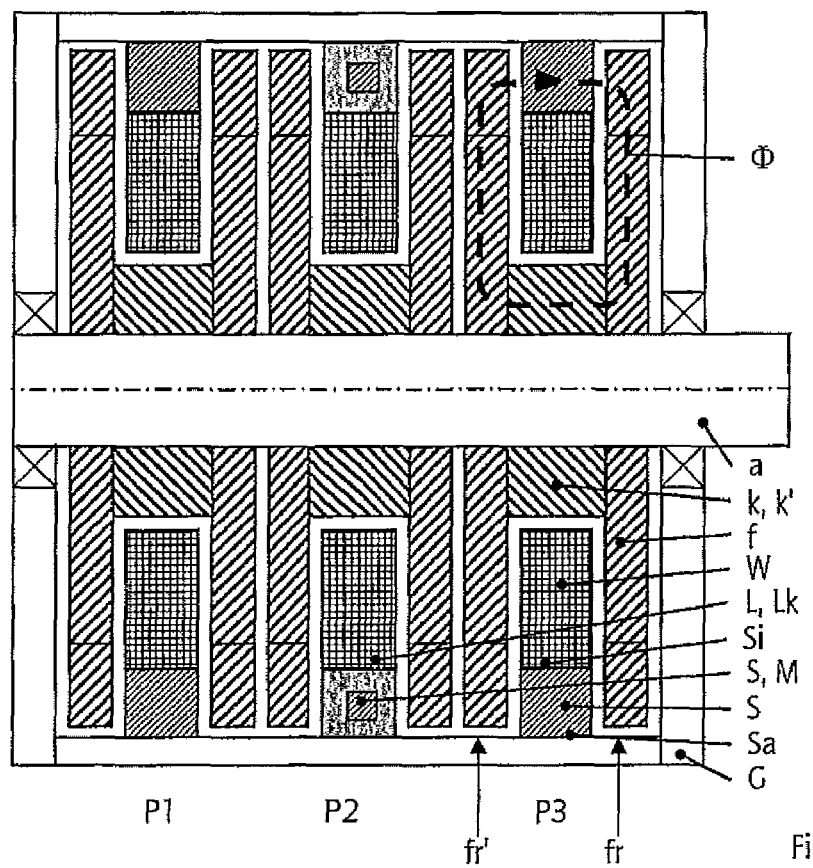
FIGS. 3a,b respectively show a longitudinal-section illustration and a cross-sectional illustration of the electrical machine in the form of a three-phase asynchronous machine with excitation in the form of short-circuited rings, with these short-circuited rings each being in the form of embedded short-circuited rings between adjacent webs in the circumferential direction of the machine, or with excitation in the form of a corresponding loop winding, and FIGS. 4a,b show a further embodiment of the machine shown in FIG. 3.

FIGS. 1a, b produce a three-phase machine to illustrate one embodiment of the electrical machine in the form of a longitudinal-section illustration (FIG. 1a) and a cross-sectional illustration (FIG. 1b). This is a three-phase asynchronous machine or a synchronous machine with the phases P1, P2 and P3. This machine comprises a rotationally symmetrical housing G, which is fitted with a stationary part S, M, L, W of the machine, with three web crowns, which are axially separated from one another, with a number of webs S, M being arranged on an inner wall of the housing G. In the example in the embodiment, the number of webs S, M in the circumferential direction is 32, and this corresponds to the number of poles in the machine.

The webs S, M of the second phase P2 are rotated through one third of the pole pitch with respect to the webs S, M of the first phase P1 in the present, three-phase embodiment. The rotation for the third phase P3 is two thirds with respect to the first phase P1. A concentric winding is fitted internally to these webs S, M, as a first winding structure W.

A moving part k, k', f of the machine is arranged on a rotor axis a, to which two respective impeller wheels fr, fr' with magnetically conductive blades f are fitted for each phase P1, P2, P3. In this embodiment, the blades f are aligned flush with one another, with these blades f being formed radially and considered from the rotor axis a at least in the area of the webs S, M as blades f which are separated from one another in the circumferential direction of the machine; they can also be connected to one another. In the area of the webs S, M, a number of blades f, in the present example 16 blades f, are distributed over the circumference, corresponding to the number of pole pairs. Adjacent impeller wheels fr, fr' of a respective phase P1, P2, P3 are connected by means of a magnetically permeable core k, or a permanent magnet k'.

Furthermore, the machine has a second winding structure L, Lk, Ls. This second winding structure L, Lk, Ls is in the form of individual short-circuited windings Lk or in the form of a loop winding Ls on the webs S, M. In this case, the short-circuited windings Lk, or the loop winding Ls, is or are arranged with their respective coil axes parallel to the rotor axis a on the webs S, M. These short-circuited windings Lk, or loop winding Ls in the present example extend or extends between the radially inner web ends Si and the radially outer web ends Sa and therefore completely surround or surrounds the webs S, M. This machine has 32 poles, that is to say 16 pole pairs and 16 blades f on the impeller wheels fr, fr'. The impeller wheels fr, fr' of all the adjacent phases P1, P2, P3 in this embodiment are aligned flush with one another while, in contrast, the webs S, M of the phases have a phase shift. This is clearly shown in FIG. 1a, which illustrates the correspondingly phase-shifted phases P1, P2, P3 sectioned differently. In the phase P1, the section passes radially through a short-circuited winding Lk or a loop winding Ls, the phases P2, P3 have sections through the webs S, M, and the short-circuited windings Lk or the loop winding Ls on the inner web ends Si and the outer web ends Sa. With the short-circuited windings Lk for excitation and the first winding structure W for the armature winding, the present machine is used as an asynchronous machine; with a loop winding Ls as excitation, this machine acts as a synchronous machine or as a brushless asynchronous machine.

A current in the first winding structure W results in a field being produced, which results in a magnetic flux Φ being produced in the magnetic circuit. The magnetic circuit comprises the core k, k', two axially adjacent blades f, the two air gaps between the blades f and the associated web S, M. Depending on the magnetization of the blades f and their position with respect to the webs S, M, an attraction force (Maxwell force) is created in the axial and tangential direction between the blade f and the web S, M. The force in the axial direction produces only a mechanical load on the components but no significant movement, since the blades f and the webs S, M cannot move beyond their elasticity in this direction. The tangential force results in a movement of the blades f, since this can rotate with the rotor axis a. The phase shift, as mentioned above, between the phases P1, P2 and P3 results in an approximately constant force in the circumferential direction—depending on the phase sequence in the drive—and therefore a torque.

The embodiment of the machine shown in FIGS. 2a, b (longitudinal section and cross section) has a second winding structure L, Lw in addition to the first winding structure W, and the second winding structure L, Lw is arranged as a wave winding Lw on the webs S, M. This wave winding Lw is distinguished in that all the webs S, M are provided with the wave winding Lw on their radial faces, while in contrast webs S, M which are directly adjacent in the circumferential direction each alternately have only a winding part of the wave winding Lw at the radially inner web end Si or at the radially outer web end Sa. When the wave winding Lw is used as a field winding, then adjacent webs S, M have a magnetic polarity in the opposite sense, and, by way of example, there are once again 16 pole pairs on the webs S, M and 16 blades on the impeller wheels fr, fr'. With the first winding structure W as an armature winding, this machine acts as a synchronous machine. In this case as well, the webs S, M of the individual phases P1, P2, P3 are arranged with a phase shift with respect to one another; FIG. 2a illustrates this using the different sections of the wave winding Lw, specifically with a radial section through this wave winding Lw in phase P1 and with sections through the webs S, M of the phases P2 and P3 and through the wave winding Lw at the outer web end Sa and at the inner web end Si, respectively.

FIGS. 3a, b once again show an asynchronous machine in the form of a longitudinal-section illustration (FIG. 3a) and a cross-sectional illustration (FIG. 3b), in a similar manner to those shown in FIGS. 1a, b. The difference is in the arrangement of the second winding structure L, Lk which, in the present case is in the form of an embedded winding structure, with each individual short-circuited winding Lk in each case being arranged between two adjacent webs in the circumferential direction. In comparison to the illustration in FIGS. 1a, b, the short-circuited windings Lk in FIGS. 3a, b are rotated through 90° and therefore have a tangential magnetic flux direction through them. In order to close the magnetic flux path Φ, which in the present case is passed across axial air gaps, the impeller wheels fr, fr' of each phase in this embodiment of the machine are aligned rotated through one pole pitch, because of the tangential flux through the short-circuited windings Lk.

Figure 3B:
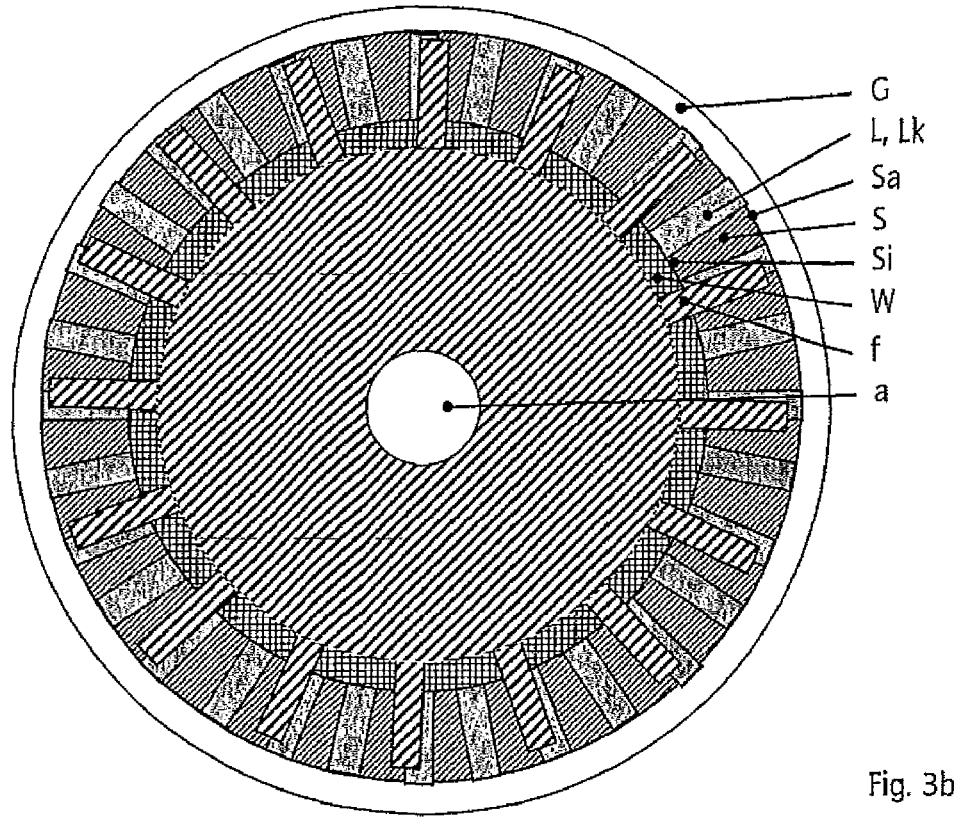

The machine shown in FIGS. 3a, b can also be equipped with a loop winding Ls instead of the short-circuited windings Lk described above; this machine can therefore also be used as a synchronous machine or as a brushless slip ring asynchronous machine.

Figure 4A:
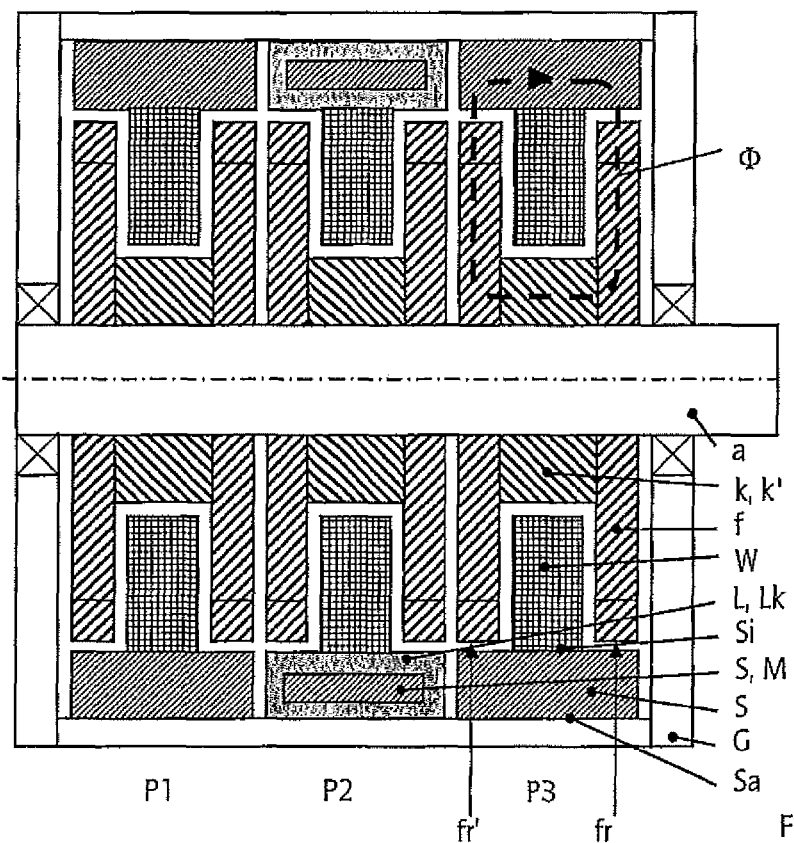
Figure 4B:
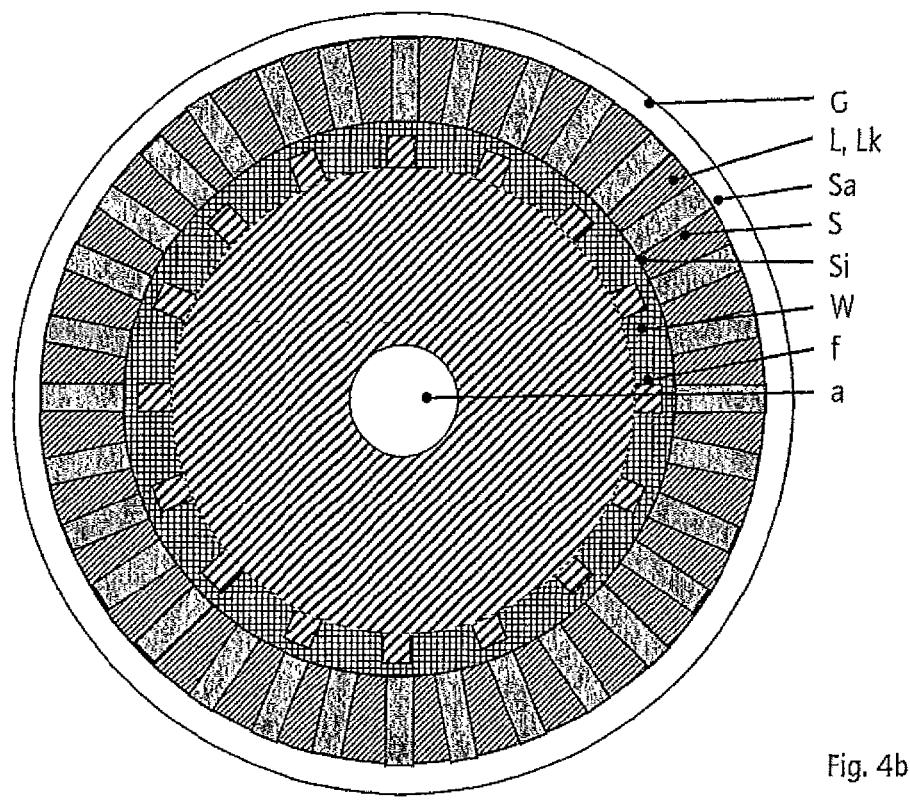

FIGS. 4a, b show a further refinement of the asynchronous machine as is shown in FIGS. 3a, b. The major difference here is that the air gap is directed radially rather than axially, with the webs S, M and the short-circuited windings Lk embedded between two webs S extending radially outwards from the machine over the entire width of two adjacent impeller wheels fr, fr'. In this case as well, of course, a loop winding Ls, as already explained above, can be used instead of the short-circuited windings Lk.

Without departing from the idea of the above-disclosed embodiments, it is feasible for the machines illustrated in FIGS. 3a, b and FIGS. 4a, b to be provided with an embedded wave winding Lw as the second winding structure, instead of being provided with short-circuited windings.

Furthermore, it is feasible for the impeller wheels fr, fr' to be in the form of disks with a radially internally articulated flange attachment; this means that the impeller wheels fr, fr' would have an L-shaped structure in an axial section. If a flange were to be formed on both sides, an impeller wheel fr, fr' would have a T-shaped axial section; these two variants are not the subject matter of the illustration in the figures of the drawing.

What is claimed is:

1. An electrical machine for conversion of electrical energy to mechanical energy and vice versa, the electrical machine comprising:
   a moving part comprising an inner rotor without windings, wherein the rotor comprises at least two magnetic conductors which are separated from one another axially such that a first and a second impeller wheel are formed;
   a stationary part comprising:
      a number of magnetically acting webs in the circumferential direction of the machine which are operatively connected to the magnetic conductors of the rotor,
      at least one first winding structure which is likewise operatively connected to the axially separated magnetic conductors of the rotor, and
      a second winding structure arranged on the webs, wherein either the first winding structure acts as an armature winding and the second winding structure acts as a field winding, or vice versa;
   wherein the first and the second impeller wheel are radially innerly magnetically effectively connected by a further magnetic conductor;
   wherein the stationary part has the number of webs corresponding to a number of poles in the machine, each having a radially inner web end and each having a radially outer web end, and wherein the first winding structure is in the form of a ring winding, and the second winding structure extends, considered radially, between the inner and the outer web ends;
   wherein the first winding structure is in the form of a ring winding coaxial with respect to a rotor axis; and
   wherein the second winding structure is in the form of a number of short-circuited windings, corresponding to the number of poles in the machine, between the first radially inner winding structure and the radially outer web ends.

2. The electrical machine as claimed in claim 1, wherein the machine is a two-phase or poly-phase machine, wherein one stationary part is provided for each phase, and wherein these at least two stationary parts are arranged alongside one another in an axial direction of the machine.

3. The electrical machine as claimed in claim 2, wherein the at least two stationary parts are arranged rotated with respect to one another with a phase shift in the circumferential direction.

4. The electrical machine as claimed in claim 2, wherein the at least two stationary parts are arranged between two magnetic conductors, which are axially separated from one another, in the rotor, or wherein the at least two stationary parts are axially separated from one another and are each arranged between two magnetic conductors, which are axially separated from one another, of the rotor.

5. The electrical machine as claimed in claim 1, wherein the magnetic conductor of the rotor which has no windings is in the form of a permanent magnet.

6. The electrical machine as claimed in claim 1, wherein the webs which are surrounded by a second winding structure are each in the form of permanent magnets.

7. An electrical machine for conversion of electrical energy to mechanical energy and vice versa, the electrical machine comprising:
   a moving part comprising an inner rotor without windings, wherein the rotor comprises at least two magnetic conductors which are separated from one another axially such that a first and a second impeller wheel are formed;
   a stationary part comprising:
      a number of magnetically acting webs in the circumferential direction of the machine which are operatively connected to the magnetic conductors of the rotor,
      at least one first winding structure which is likewise operatively connected to the axially separated magnetic conductors of the rotor, and
      a second winding structure arranged on the webs, wherein either the first winding structure acts as an armature winding and the second winding structure acts as a field winding, or vice versa;
   wherein the first and the second impeller wheel are radially innerly magnetically effectively connected by a further magnetic conductor;
   wherein the stationary part has the number of webs corresponding to a number of poles in the machine, each having a radially inner web end and each having a radially outer web end, and wherein the first winding structure is in the form of a ring winding, and the second winding structure extends, considered radially, between the inner and the outer web ends;
   wherein the first winding structure is in the form of a ring winding coaxial with respect to a rotor axis; and
   wherein the second winding structure is in the form of a wave winding between the first winding structure and the radially outer web ends in the circumferential direction, and wherein each web of a machine pole is bounded by radially running turn parts of the wave winding, and adjacent webs alternately have only one tangentially outer winding part or one tangentially inner winding part of the wave winding of the second winding structure.

8. An electrical machine for conversion of electrical energy to mechanical energy and vice versa, the electrical machine comprising:
   a moving part comprising an inner rotor without windings, wherein the rotor comprises at least two magnetic conductors which are separated from one another axially such that a first and a second impeller wheel are formed;
   a stationary part comprising:
      a number of magnetically acting webs in the circumferential direction of the machine which are operatively connected to the magnetic conductors of the rotor, at least one first winding structure which is likewise operatively connected to the axially separated magnetic conductors of the rotor, and a second winding structure arranged on the webs, wherein either the first winding structure acts as an armature winding and the second winding structure acts as a field winding, or vice versa;

wherein the first and the second impeller wheel are radially innerly magnetically effectively connected by a further magnetic conductor;

wherein the stationary part has the number of webs corresponding to a number of poles in the machine, each having a radially inner web end and each having a radially outer web end, and wherein the first winding structure is in the form of a ring winding, and the second winding structure extends, considered radially, between the inner and the outer web ends;

wherein the first winding structure is in the form of a ring winding coaxial with respect to a rotor axis; and wherein the second winding structure is arranged in the form of a loop winding between the first winding structure and the radially outer web ends in the circumferential direction of the machine, wherein each web of a machine pole is surrounded by a loop winding with a number of turns in the circumferential direction and along its radial and tangential web faces, and wherein adjacent loop windings each having the same number of turns are located together an the radial web faces, and have an alternating winding sense.

9. An electrical machine for conversion of electrical energy to mechanical energy and vice versa, the electrical machine comprising:

a moving part comprising an inner rotor without windings, wherein the rotor comprises at least two magnetic conductors which are separated from one another axially such that a first and a second impeller wheel are formed;

a stationary part comprising:
  a number of magnetically acting webs in the circumferential direction of the machine which are operatively connected to the magnetic conductors of the rotor,
  at least one first winding structure which is likewise operatively connected to the axially separated magnetic conductors of the rotor, and
  a second winding structure arranged on the webs, wherein either the first winding structure acts as an armature winding and the second winding structure acts as a field winding, or vice versa;

wherein the first and the second impeller wheel are radially innerly magnetically effectively connected by a further magnetic conductor;

wherein the stationary part has the number of webs corresponding to a number of poles in the machine, each having a radially inner web end and each having a radially outer web end, and wherein the first winding structure is in the form of a ring winding, and the second winding structure extends, considered radially, between the inner and the outer web ends;

wherein the first winding structure is in the form of a ring winding coaxial with respect to a rotor axis; and wherein the second winding structure is arranged between the first winding structure and a housing which bounds the machine, wherein this second winding structure is in the form of an embedded winding structure, and each partial winding of the second winding structure is arranged between in each case two webs which are adjacent in the circumferential direction.

* * * * *